United States Patent [19]
van Gulick

[11] 3,900,447
[45] Aug. 19, 1975

[54] THERMALLY ACTIVATED PROMOTERS FOR SALT COMPLEX CURING AGENTS

[75] Inventor: Norman Martin van Gulick, Wilmington, Del.

[73] Assignee: E. I. Du Pont de Nemours and Company, Wilmington, Del.

[22] Filed: Apr. 30, 1974

[21] Appl. No.: 465,698

[52] U.S. Cl. ............... 260/77.5 AM; 260/18 TN
[51] Int. Cl.² ............... C08G 18/32; C08G 18/38
[58] Field of Search ............... 260/77.5 AM, 18 TN

[56] References Cited
UNITED STATES PATENTS
3,755,261  8/1973  van Gulick ............... 260/77.5 AM

OTHER PUBLICATIONS

Mandelcorn (ed), Non–Stoichiometric Compounds, Academic Press, NY, 1964.

Primary Examiner—M. J. Welsh

[57] ABSTRACT

NCO-terminated urethane polymers or prepolymers are cured effectively by heating with (1) a complex of 4,4′-methylenedianiline and/or racemic 2,3-di(4-amino-phenyl)butane and selected alkali metal salts, especially sodium chloride, and (2) a urea channel inclusion complex.

15 Claims, No Drawings

THERMALLY ACTIVATED PROMOTERS FOR SALT COMPLEX CURING AGENTS

BACKGROUND OF THE INVENTION

The curing of amine-curable polymers, such as isocyanato-terminated polyurethane prepolymers is well known. In the past, curing has generally involved mixing the amine curing agent with the curable polymer by means suitable for the materials involved and forming the mixture into a useful form, followed by a heating step to complete the curing reaction. A problem which is encountered in this prior art procedure is the premature reaction of the curing agent with the curable polymer during the mixing step and during the interval following mixing until the forming operation is completed. The problem posed by the premature reaction or curing varies widely in degree for different amine curing agent/polymer systems, but must be taken into consideration in most instances. In more reactive systems such as those employing isocyanato-terminated polyurethane prepolymers the problems resulting from pre-reaction have previously necessitated the use of special low-residence time mixers and selected diamines of reduced reactivity as curing agents.

A method for preventing this premature reaction and bringing about an outstanding cure of the various aminecurable polymers such as isocyanato-terminated polyurethane prepolymers, epoxy resins and millable halogen-containing hydrocarbon polymers is to be found in U.S. Pat. No. 3,755,261 to Norman M. van Gulick.

In essence, curing of polymers effected with amines is thought to involve chain extension of a prepolymer or cross-linking of the polymer itself. In the case of the urethane polymers, a prepolymer is generally transformed from a viscous liquid having a molecular weight of less than about 3,000 to a solid having a molecular weight in excess of 10,000. The solids range from rubbery materials to hard plastics with a wide variety of known uses, e.g., molded tires, machine parts and potting compositions. In the case of amine-curable millable gums, such as polychloroprene, the gum is converted to a cross-linked elastomer with valuable physical properties.

The previously mentioned U.S. Pat. No. 3,755,261 represents a significant improvement in the art. The complete cure effected, however, by the technique included therein, often requires the use of somewhat elevated temperatures, e.g., 130° to 150°C. There are instances wherein it is desirable to operate at lower temperatures and there are instances when it is desirable to increase the rate of cure at a given elevated temperature. Thus a need exists for a curing technique which will operate at lower temperatures and may also increase the rate of curing at elevated temperatures while still effecting an outstanding cure of the polymer. Of course, it is also desirable that the curing agent utilized not significantly reduce the pot life of a system.

SUMMARY OF THE INVENTION

According to this invention a curing system which will promote the desired kind of cure has been discovered. The process of effecting the cure and the cured product are also intended to be within the scope of the instant invention. The curing agent comprises a complex of 4,4'-methylene dianiline (MDA) and an alkali halide salt, e.g., NaCl, used in conjunction with an effective amount of a urea channel inclusion complex. Such urea complexes are discussed in detail in Chapter 8 of NON-STOICHIOMETRIC COMPOUNDS, edited by L. Mandelcorn, Academic Press, New York and London, 1964, the disclosure of which is herein incorporated by reference. In brief, urea molecules can crystallize in such a manner that hollow channels large enough to accommodate certain molecules are formed. The urea molecule is known as the host and the molecule contained in the channel is known as the guest.

It is known that urea has the capacity to accelerate the curing and in some instances lower the temperature required for the curing effected by the MDA-salt complex. In fact, urea is such an effective accelerator that it can accelerate the activity of the MDA-salt complex even at relatively low temperature; on occasion this may be quite detrimental.

For instance, if one desires to comingle the MDA-salt complex with the urethane prepolymer or polymer and the urea accelerator, in a one-can system, the shelf life of such a system will be reduced because of the presence of the urea. In the presence of urea, curing will proceed at a significant rate at temperature as low as 40°C. Thus the pot life available during the curing procedure will be seriously shortened. A long pot life is almost always desirable because it permits ample time for thorough mixing of curable prepolymer and curing agent, for checking the proportions of prepolymer and curing agent in the mixture, if desired, and for forming or shaping the curable mixture. The term "pot life" is used to indicate the time after mixing the prepolymer and curing agent during which the mixture remains workable, as indicated by being pourable or pumpable, for example.

The presence of the urea in the form of an adduct with a suitable guest serves to keep the urea from prematurely promoting curing of mixtures of MDA-salt complex and urethane polymers or prepolymers. As a result, the pot life of the curable system is far longer than if urea were utilized alone and not in the form of an adduct. The pot life with the urea present as an adduct can range from days to months at room temperature with substantially no cure being effected. By substantially no cure is meant that the mixture remains workable, as indicated by being pourable or pumpable. By proper selection of ingredients, curable mixtures having sufficient pot life to be considered items of commerce, so-called one-can curable compositions, can be prepared.

The urea adduct should be present in effective amount so that after the adduct is decomposed there is sufficient urea to measurably acclerate curing; the amount will generally vary between about 0.1 and 10% by weight, preferably between about 0.3 and 5% and most preferably between about 0.5 and 2%. If properly chosen, the guest molecule within the adduct may also serve as a promoter or it may be inactive and thereby serve only to prevent the urea from becoming available until the adduct is heated to a sufficient temperature so that it decomposes. The temperature at which the urea complexes begin to dissociate in a typical urethane prepolymer system ranges from about 40° to 80°C. Rapid dissociation occurs at about 90° to 110°C. at which temperatures, and higher temperatures, curing can be effected in a reasonable time. It should be noted that the urea complexes when in pure form generally dissociate near the melting point of urea (mp 133°C.), i.e., usually somewhere in the range 110°140°C. The presence of other organic materials such as the prepolymer itself or plasticizers generally lowers the dissociation temperature. The free urea provided by dissociation of the adduct accelerates the cure which is effected by the MDA-salt complex by promoting dissociation of the latter.

The combination of the urea adduct and MDA-salt complex may be utilized for the curing of all NCO-containing urethane prepolymers or polymers. It is preferred to utilize it for the curing of NCO-terminated urethane prepolymers.

Certain classes of guest molecules may accelerate the curing reaction beyond the acceleration provided by the urea. Typical guest molecules which may be utilized include long chain fatty acids and long chain alcohols and diols, which serve as accelerators for the curing reaction, and straight chain hydrocarbons, ethers and esters, which do not serve to appreciably accelerate the curing reaction. Because the molar ratio of urea to guest is typically high, any promoting effect by the guest molecules is often masked by the promoting effect of the urea.

DETAILED DESCRIPTION

Urethane prepolymers and polymers which are to be cured according to the instant invention may be defined as prepolymers and polymers containing isocyanato groups.

The polyurethanes are generally formed by first reacting a polyether polyol or a polyester polyol with a molar excess of an organic diisocyanate to form a prepolymer having terminal isocyanato groups. The prepolymer is then cured to increase its molecular weight from less than about 3,000 to upwards of about 10,000. Examples of such polymers are described in U.S. Pat. Nos. 2,620,516, 2,777,831, 2,843,568, 2,866,774, 2,900,368, 2,929,800, 2,948,691, 2,948,707, 3,114,735; herein incorporated by reference.

The urea channel inclusion complex or adduct may be selected from urea adducts which decompose when dispersed in a prepolymer or polymer in the desired temperature range, e.g., between about 60° and 140°C., preferably between about 80° and 130°C. It should be present in an amount of about 0.1 to 10 weight percent, preferably 0.3 to 5 weight percent, and most preferably 0.5 to 2 weight percent based on the total weight of the curable composition.

The channel structure of the urea adduct is bound together by hydrogen bonds; at the decomposition temperature of a given adduct, said bonds dissociate and the components of the adduct, the host and guest, separate from one another. At that point the urea is free to act as an accelerator for curing a urethane prepolymer or polymer. After dissociation the guest molecule may also serve as an accelerator but this is not essential to the instant invention. As previously indicated the large molar ratio of urea to guest often results in the accelerating effect of promoting guest molecules being masked by the effect of the urea. Guest molecules which serve as strong promoters are tetraethylene glycol, stearic acid, and adipic acid. Guest molecules which do not serve as promoters are hexadecane, stearonitrile, stearone, dilauryl ether, methyl arachidate, butoxyethyl stearate, stearyl stearate, 1,4-butanediol dilaurate, cetyl palmitate, myristyl benhenate, and, of course, mixtures of higher straight-chain esters that predominately constitute the naturally occurring vegetable and animal waxes, such as carnauba wax, ouricuri wax, beeswax, and spermaceti. Of course, preferred guests should be chemically and physically compatible with the prepolymer and with the final vulcanizate.

Stearic acid and derivatives thereof are a preferred class of guest molecules because of their ready availability. Of these, 2-butoxyethyl stearate is especially preferred. In any event, the urethane prepolymer or polymer may be cured at a temperature of about 60° to 140°C., and preferably about 80° to 130°C.

Without the presence of the free urea provided by dissociation of the adduct, curing temperatures as high as 150°C. may be required.

The preferred urethane prepolymers which are to be cured according to the instant invention are reaction products of about 1.4 to 3.0 moles of a diisocyanate selected from tolylene diisocyanate, 4,4'-methylenebis(phenyl isocyanate) and 4,4'-methylenebis(cyclohexyl isocyanate) with 1 mole of a polyalkylene ether glycol or polyester glycol having a molecular weight of about 400–3,000. Optionally, mixtures of polyether or polyester glycols with low molecular weight diols (molecular weight less than about 250) such as butanediol may be used in place of the polyether or polyester glycol. Especially preferred are prepolymers derived from tolylene diisocyanate and polytetramethylene ether glycol.

With regard to forming the salt complex, it is prepared by adducting 4,4'-methylenedianiline and a suitable salt, the salt being selected from nitrites and halides, except the fluorides, of sodium and lithium and sodium cyanide or by forming a complex between racemic 2,3-di(4-aminophenyl)butane and a halide salt, except the fluoride, of sodium, potassium, rubidium and cesium. Specifically, the compositions to be utilized as curing agents for aminecurable polymers include the reaction products of 4,4'-methylenedianiline with the following salts, in the ratio of 3 moles of methylenedianiline to 1 mole of salt: sodium chloride, sodium bromide, sodium iodide, sodium nitrite, lithium chloride, lithium bromide, lithium iodide, lithium nitrite and sodium cyanide, and the reaction products of racemic 2,3-di(4-aminophenyl)butane with the following salts in the ratio of 3 moles of diamine to 1 mole of salt: sodium chloride, sodium bromide, sodium iodide, potassium chloride, potassium bromide, potassium iodide, rubidium chloride, rubidium bromide, rubidium iodide, cesium chloride, cesium bromide and cesium iodide. The complex is then used in conjunction with the urea adduct.

Because of availability and cost, the complexes derived from 4,4'-methylenedianiline and sodium chloride or lithium chloride are especially preferred.

There are a variety of methods for preparing the complexes which are used in the instant in conjunction with the urea adduct.

In one method for preparing the complexes of this invention, an aqueous solution or brine containing a sodium or lithium salt selected from the group consisting of the chloride, bromide, iodide and nitrite is reacted with 4,4'-methylenedianiline (also referred to hereinafter as MDA), either in a solvent, having a degree of mutual solubility for both water and for the MDA, such as an alcohol, or with solid MDA in the substantial absence of a solvent. If the salt is present in relatively dilute concentration, for example, between about 1 and about 12% by weight, a solvent for the MDA preferably is employed. If the salt is present in concentration above about 12% by weight, then no solvent need be employed, solid crystalline MDA being added directly to the salt solution.

A crystalline precipitate formed by interaction of the salt and the MDA is separated from the liquid phase, e.g., by filtration. The precipitate has a 3:1 mole ratio of MDA to salt and may be decomposed into its original constituents by adding a solvent such as acetone at an elevated temperature in the range of about 40° to 100°C., depending on the volatility of the solvent.

In the solvent method of preparing the complexes, a relatively dilute aqueous solution (1 to 12 percent by weight salt) of a sodium or lithium salt selected from the group comprising the chloride, bromide, iodide, and nitrite, may be mixed with a solution of 4,4'-methylenedianiline in a suitable solvent, e.g., methanol, at a temperature in the range from about 20° to 60°C. Under these conditions, the MDA reacts with the sodium or lithium salt to form a crystalline precipitate consisting of MDA and the salt in a 3:1 mole ratio. The crystalline precipitate is then separated from the mother liquid by filtration, decantation, centrifuging or other suitable operation.

In the method of preparation in which a more concentrated salt solution (more than about 12% by weight of salt) may be employed, solid crystalline MDA is added to the salt solution with agitation at a somewhat higher temperature in the range of from about 50° to 90°C. in an amount somewhat in excess of the stoichiometric quantity required to react with that amount of salt which is present in excess of about 12% by weight. Under these conditions, 3 moles of MDA react with 1 mole of salt to form a crystalline precipitate which may be separated from the remaining solution by filtration, decantation, centrifuging or other suitable operation.

Complexes of other salts, such as sodium nitrite, may be formed by substantially the same procedures outlined for the sodium chloride complexes.

The urea adducts are prepared by bringing the addends into effective contact at some temperature below the decomposition temperature of the adduct in the particular system. Said contact can be effected in a completely liquid system as when molten guest or a concentrated solution of the guest in some indifferent solvent, such as benzene, hexane, or alcohol, is added to a concentrated solution of urea in some indifferent solvent, such as water or alcohol. But it is also possible to effect adduction when one or both of the addends are present in solid form. As an extreme example, it is well known that a mixture of the appropriate quantities of urea and stearic acid, if merely moistened with a catalytic amount of methanol, readily and rapidly transforms to adduct at room temperature. Preparations are usually completed, as would be expected, by collecting the product, washing it, if desired, and drying.

The formation of urea channel inclusion complexes is not a chemical reaction in the usual sense and the complexes themselves are non-stoichiometric in composition. nevertheless, it is possible to estimate the amount of each addend that will be required to form any given adduct because the molecular length of a guest molecule is either known or can be estimated. It has been determined by X-ray diffraction that the C-unit cell repeat distance in n-alkane complexes is 11.0A and that the unit cell contains 6 urea molecules. Thus, for normal alkane guests, the host/guest mole ratio is calculated to be $$(\text{urea/alkane}) = 0.685\ n + 1.55$$

where $n$ is the carbon number.

All of the channel inclusion complexes of urea have been found to be isomorphous and the same equation has been found to be approximately true for other guests as well, such as n-alcohols, acids, esters, halides, diglycerides, olefins, etc.

Generally, the urea adduct will make up about 0.3 to 5.0 weight percent, preferably 0.5 to 2.0 weight percent, of the curable composition of salt complex, urea adduct and urethane prepolymer.

Prior to the curing operation itself, mixing and/or milling of the polyurethane with finely divided particles of the salt complex and the urea adduct is required. Typically, the particle sizes of the MDA-salt complex and urea adduct will be between about 0.5 and 50 microns, preferably 1 to 20 microns, and most preferably, less than 10 microns. Grinding of the salt complex or the urea adduct can be accomplished in standard grinding equipment such as the fluid energy mill and vertical hammer mills employing air classification to remove ground materials from the mill.

It is usually much more preferable to disperse the MDA-salt complex in an inert carrier liquid which is miscible with the polyurethane prepolymer or polymer rather than to introduce the complex directly as a dry powder. The liquid must also be readily miscible with the prepolymer of polymer which is to be cured so that the liquid and polymer may be readily comingled. This represents a major advantage of the use of the dispersion since it serves to facilitate dispersion of the curing agent uniformly throughout the prepolymer or polymer without requiring the expenditure of much energy. It has been found that when the finely divided curing agent is added alone to the polymer or prepolymer that relatively intensive mixing is required to adequately disperse the curing agent. This is not merely inconvenient, but may result in some premature curing because of the heat generated from the mixing operation. It is believed that this difference in mixing ease is due to the presence of agglomerates of small particles in the dry curing agent which are not present in the dispersions. In addition, an oil-soluble dispersing agent may be added if desired. The dispersing agent serves to facilitate dispersion of the complex in the vehicle liquid and reduces the viscosity of the resulting dispersion. A typical dispersing agent which has proven effective is lecithin. Other oil-soluble surface active agents can be used including phosphated mono- and diglycerides, cetyl pyridinium bromide and cetyl trimethyl ammonium bromide. Quaternary ammonium chlorides or bromides in which three of the substituents on the nitrogen are $C_1$–$C_4$ lower alkyl groups and the fourth substituent is a polypropylene ether glycol residue containing 5 to 50 oxypropylene units are especially preferred. Preferred examples of vehicle liquids include di(2-ethylhexyl)phthalate, tetraethylene glycol bis(2-ethylhexanoate) and Dutrex 739 oil, an aromatic process oil which is a product of the Shell Oil Company and comprises 0% asphaltenes, 18% polar compounds, 76% aromatics and 6% saturated petroleum derivatives determined by the Clay-Gel method of ASTM D2007. Additional useful liquids include other esters of phthalic acid and related isophthalate and trimellitate esters, esters of stearic and oleic acid, esters of pentaerythritol, esters of aliphatic diacids such as adipic, azeleic and sebacic acids, triaryl phosphates, aromatic and naphthenic hydrocarbon processing oils or extenders, polyethers such as di(butylcarbitol)formal, halogenated biphenyls and liquid aromatic sulfonamides.

The dispersions can be prepared by the following illustrative means. After dry drinding, the complex can be dispersed in the liquid vehicle by means of any high shear mixer such as a three roll mill, colloid mill, or a ball mill. Equipment used by the paint industry for dispersing pigments in paint vehicles is also satisfactory. A concise description of grinding and milling equipment can be found in "The Encyclopedia of Chemical Process Equipment", W. J. Mead, Reinhold Publishing Corp., 1964, pps. 485–507 and 615–632. It should be noted that ball mills and other related tumbling mills can be used for wet grinding as well as dry grinding so that grinding and preparation of the dispersion can be accomplished in one operation. Attrition mills in which a mixture of sand or steel shot with a premix of complex and liquid vehicle are agitated by rotating discs or bars are particularly effective for reducing particle size simultaneously with formation of dispersion. Dispersions containing up to about 75 weight percent of complex can be prepared. Generally, it is more convenient to prepare and use dispersions containing 40 to 60 weight percent of complex.

It is also generally preferred to employ the urea channel inclusion adducts in the form of dispersions for the same reasons given for the MDA-salt complex. Dispersions of the urea adducts can be prepared by the procedures already described for the salt complexes. The same carrier liquids can be used; however, preferred dispersions are those in which the guest molecules are the same as the inert liquid vehicles; for example, the adduct of urea and 2-butoxyethyl stearate dispersed in 2-butoxyethyl stearate. Because of equilibrium considerations, there is very little free urea in these preferred dispersions.

In mixing the MDA-salt complex and the urea adduct with either fluid prepolymers of millable gums, the temperature must be kept below the decomposition point of the urea adduct in order to avoid the possibility of premature curing. In the present process, the decomposition point of the adduct is a function of the particular adduct being used and the polymer, including other ingredients such as plasticizers in which the adduct is dispersed. For isocyanate-terminated urethane prepolymers with the sodium chloride complex of methylenedianiline and the urea adduct of 2-butoxyethyl stearate mixing should be performed below about 50° to 60°C.

The combination of complex and urea adduct referred to herein as the curing agent, should provide a minimum of 70% of the theoretical amount of active hydrogen required to react with the NCO groups contained in the polyurethane prepolymer. In making this calculation, it is assumed that the methylenedianiline provided by the complex reacts with the polymer in the same way that free methylenedianiline reacts. It is further assumed that the urea provided by the adduct is not reactive; however, reactive guest molecules containing hydroxyl and/or amine groups are assumed to react. The amount of complex and adduct employed generally should not provide more than about 120% of the active hydrogen required in theory to react with the NCO groups of the prepolymer.

The resulting combination of urea adduct and complex will generally effect a more rapid cure of the urethane prepolymer or polymer at a given cure temperature and/or may be used to effect the curing at a lower temperature than would be required in the absence of the urea adduct. As mentioned previously, the shelf life of a one-can system will not be substantially shortened by the presence of the urea adduct as compared to a system of urethane polymer or prepolymer and MDA-salt complex in which no urea adduct is present. Typically, curing will be effected at a temperature between about 60° and 140°C., preferably between about 80° and 130°C. Curing will usually take place in a period between a few seconds and 16 hours, preferably less than 8 hours, and most preferably less than 2 hours.

It is believed that the reactions which take place in the present curing processes are identical to those which occur when free MDA is used as a curing agent by prior art curing procedures.

The curing equipment and curing procedures used in the present process are conventional.

This process has particular utility when one wishes to cure at a lower temperature such as those instances when one is utilizing epoxy molds rather than metallic molds, since epoxy molds will be adversely effected by elevated temperatures.

The following examples are illustrative of the present invention and therefore are not intended in any way as a limitation of the scope thereof. Parts and percents are by weight unless otherwise indicated.

EXAMPLES

The following ASTM methods are employed in determining the properties of the elastomers prepared in the examples

| | | |
|---|---|---|
| Tensile Strength, $T_B$ | D | 412 |
| Elongation at Break, $E_B$ | D | 412 |
| Modulus, 100%, $M_{100}$ | D | 412 |
| Modulus, 300%, $M_{300}$ | D | 412 |
| Permanent Set, $PS_B$ | D | 412 |
| Trouser Tear | D | 470* |
| Compression Set | D | 395 |
| Bashore Resilience | D | 1054 |
| Hardness, Durometer A | D | 676 |

*Modified by use of 3.8 cm × 7.6 cm sample with 3.8 cm cut on the long axis of the sample. This configuration prevents "necking down" at the point of tearing.

EXAMPLE 1

A. Preparation of Urea Channel Inclusion Complex

In a reactor equipped with mechanical agitation and a reflux condenser, 240 g of urea is dissolved in 480 ml of methanol heated to reflux. The source of heat is removed and 120 g of 2-butoxyethyl stearate is added dropwise over a period of 5–10 minutes. The crystalline channel inclusion complex forms exothermically as the stearate is added. The resulting thick slurry is allowed to cool to about room temperature and the product is collected by filtration. The filter cake is given a displacement wash with n-hexane to remove excess 2-butoxyethyl stearate and dried. The dry product weighs 316 g. Analysis of the product indicates that the product contains 19.0 moles of urea per mole of 2-butoxyethyl stearate.

Analysis: C, 33.6, 33.8; N, 34.7, 34.9.

B. Preparation of a Dispersion of Urea Channel Inclusion Complex

The following materials are combined in a ball mill:
100 parts urea/2-butoxyethyl stearate complex prepared in Part A
100 parts 2-butoxyethyl stearate
3.0 parts $[CH_3N(C_2H_5)_2([C_3H_6O]_xH]^+ Cl^-$, where $x \approx 25$
1.0 part "Bentone" 38 gellant* pre-wet with 0.3 parts of propylene carbonate  * An organically modified montmarillonite clay available from Pigments and Chemicals Division, NL Industries, Hightstown, New Jersey. Its function is to prevent settling of the dispersion on storage.

The mixture is ball milled for about 16 hours. A thick, creamy dispersion of urea complex having a particle size less than 6 microns is obtained.

C. Preparation of a Dispersion of [(mda)$_3$NaCl]

The following ingredients are placed in a ball mill:
1160 parts isopropylated triaryl phosphate "Kronitex" 100, FMC Corp., Organic Chemicals Division New York, N.Y.
1200 parts [(Mda)$_3$NaCl]
40 parts $[CH_3N(C_2H_5)_2([C_3H_6O]_xH)]^+ Cl^-$, where $x \approx 25$ The mixture is ball milled for about 16 hours. A thick, smooth dispersion is produced. The average particle size is 5 microns or less. In order to prevent settling, 24 parts of "Bentone" 38 are stirred into the dispersion.

D. Curing of a Urethane Prepolymer

A curable urethane composition is prepared by mixing 100 parts of a prepolymer which is the reaction product of 1 mole of polytetramethylene ether glycol (MW~980) and 2 moles of 2,4-tolylene diisocyanate, 31.2 parts of the dispersion of [(mda)$_3$NaCl] prepared in (C) and 1.3 parts of the dispersion of urea complex prepared in (A). Mixing is accomplished below 50°C. The temperature at which this curable composition exhibits its maximum rate of cure [as evidenced by heat evolution] is determined by differential scanning calorimetry (DSC) at a rate of heating of 10°C./min. to be about 110°C. Samples for determining physical properties of the cured polyurethane are prepared by curing for 1 hour at 100°C.

A control composition consisting only of prepolymer and [(mda)$_3$NaCl] dispersion (urea complex omitted) exhibits a DSC maximum of 136°C. When cured for 1 hour at 100°C., this composition fails to provide products having sufficient cure to permit physical testing. But when the control is cured for 1 hour at 140°C., samples suitable for physical property determinations are obtained.

The physical properties of the composition cured by the process of this invention and the control composition are presented in Table I.

TABLE I

|  | Composition of this Invention | Control |
| --- | --- | --- |
| DSC Exotherm Max. °C. | 110 | 136 |
| Cure, 1 hour at temp. °C. | 100 | 140 |
| $M_{100}$, psi | 1100 | 900 |
| $M_{300}$, psi | 1500 | 1200 |
| $T_B$, psi | 5000 | 6500 |
| $E_B$, % | 440 | 460 |
| $PS_B$, % | 9 | 7 |

TABLE I-Continued

|  | Composition of this Invention | Control |
| --- | --- | --- |
| Compression Set, Method B, 22 hours at 70°C., % | 66 | 66 |
| Bashore Resilience | 43 | 27 |
| Shore A Hardness | 95 | 83 |
| Tear Strength, pli | 190 | 210 |

This example illustrates the lowering in cure temperature provided by the curing composition of this invention, and further illustrates that curing is accomplished without any detrimental effects on physical properties.

EXAMPLE 2

A dispersion of 3 MDA.NaCl complex is prepared by ball milling the following ingredients for 16 hours.
78.0 parts [(mda)$_3$NaCl] complex
42.0 parts di(2-ethylhexyl)phthalate
2.0 parts $[CH_3N(C_2H_5)_2([C_3H_6O]_xH)]^+ Cl^-$, where $x \approx 25$
0.8 part $C_{13}H_{27}SO_2Cl$ The resulting dispersion after aging for 3 days is mixed with a prepolymer which is the reaction product of 1 mole of polytetramethylene ether glycol (MW~980) and 2 moles of 2,4-tolylene diisocyanate. For each 100 parts of prepolymer, 24.6 parts of dispersion is added. To 100 part portions of this curable composition, 1 part of each of the following materials is added.

A. Dispersion of complex of urea and 2-butoxyethyl stearate in 2-butoxyethyl stearate prepared in Example 1-B.

B. A dispersion of 60 parts of the complex of urea and di(butylcarbitol)adipate in 40 parts of di(butylcarbitol)adipate prepared substantially by the procedures of Examples 1-A and 1-B. The addition product contains 18.8 urea molecules per guest molecule.

C. A dispersion of 60 parts of the complex of urea and stearic acid in 40 parts of tetraethylene glycol di(2-ethylhexanoate) prepared substantially by the procedures of Examples 1-A and 1-B. The complex contains 13.9 urea molecules per guest molecule.

D. A dispersion of 60 parts of urea itself in 40 parts of tetraethylene glycol di(2-ethylhexanoate) prepared by ball milling urea with the liquid carrier substantially by the procedure of Example 1-B. This composition and its mixture with the curable composition are outside this invention and are included as a control.

Samples of the curable composition itself and those containing A, B, C, and D are heated at 10°C./min. in a differential scanning calorimeter to determine threshold exotherm temperatures and maximum exotherm temperatures. The threshold exotherm temperature is that temperature at which curing initiates, even though slowly, as indicated by a change in slope of the DSC curve. Threshold and maximum temperatures are listed in Table II.

TABLE II

| Sample | Threshold Exotherm °C. | Maximum Exotherm °C. |
| --- | --- | --- |
| Control-Curable Composition Without Urea Complex | 116 | 152 |
| Curable Composition Plus A | 71 | 105 |

TABLE II-Continued

| Sample | Threshold Exotherm °C. | Maximum Exotherm °C. |
| --- | --- | --- |
| Curable Composition Plus B | 50 | 103 |
| Curable Composition Plus C | 63 | 103 |
| Control-Curable Composition Plus D (Urea Itself) | 39 | 104 |

The data illustrate the lowering of curing temperatures provided by the urea complexes. Urea itself also lowers the urea temperature, but the composition containing it has substantially lower threshold temperature than do the compositions containing urea complexes.

What is claimed is:

1. In a process wherein a urethane prepolymer containing free isocyanato groups is heated in contact with a complex of 4,4'-methylenedianiline and a salt to a temperature sufficient to cure the prepolymer, the salt component of the complex being selected from the group consisting of sodium chloride, sodium bromide, sodium iodide, sodium nitrite, lithium chloride, lithium bromide, lithium iodide, lithium nitrite, and sodium cyanide, the ratio of said 4,4'-methylenedianiline to salt in said complex being 3 moles to 1 mole, the improvement comprising employing the aforesaid complex in a mixture with a urea channel inclusion complex, the latter being employed in an amount of about 0.1–10% by weight of the total weight of the prepolymer and both complexes, and heating the resulting dispersion of prepolymer and both complexes to a curing temperature of about 60°–140°C., whereby the urea channel inclusion complex is decomposed.

2. The process of claim 1 wherein said complex of 4,4'-methylenedianiline and a salt is replaced by a complex of racemic 2,3-di(4-aminophenyl)butane with sodium chloride, sodium bromide, sodium iodide, potassium chloride, potassium bromide, potassium iodide, rubidium chloride, rubidium bromide, rubidium iodide, cesium chloride, cesium bromide, or cesium iodide.

3. The process of claim 1 wherein said curing takes place at a temperature of about 80°–130°C.

4. The process of claim 1 wherein said complex is derived from 4,4'-methylenedianiline and sodium chloride.

5. The process of claim 1 wherein said complex is derived from 4,4'-methylenedianiline and lithium chloride.

6. The process of claim 1 wherein said urea channel inclusion complex contains a guest molecule selected from the group consisting of a long chain fatty acid, a long chain alcohol, a long chain diol, a straight chain hydrocarbon, an ether, an ester, a halide, and an olefin.

7. The process of claim 1 wherein said urea channel inclusion complex contains a guest molecule selected from the group consisting of stearic acid and its derivatives.

8. The process of claim 7 wherein said guest molecule is 2-butoxyethyl stearate.

9. The process of claim 1 wherein said urea channel inclusion complex contains a guest molecule which is an activator for said curing.

10. The process of claim 1 wherein said urea channel inclusion complex contains a guest molecule which is not an activator for said curing.

11. A composition of matter consisting essentially of a urethane prepolymer containing free isocyanato groups, said prepolymer having dispersed therein (a) a salt complex consisting essentially of 4,4'-methylenedianiline and a salt selected from the group consisting of sodium chloride, sodium bromide, sodium iodide, sodium nitrite, lithium chloride, lithium bromide, lithium iodide, lithium nitrite, and sodium cyanide, the ratio of said 4,4'-methylenedianiline to said salt in said complex being 3 moles to 1 mole, and (b) a urea channel inclusion complex which decomposes at about 60°–140°C. when dispersed in said urethane prepolymer, said urea channel inclusion complex being present in an amount of about 0.1–10% by weight of the total weight of the prepolymer and both complexes.

12. The composition of claim 11 wherein the salt complex is derived from 4,4'-methylenedianiline and sodium chloride.

13. The composition of claim 11 wherein the salt complex is derived from 4,4'-methylenedianiline and lithium chloride.

14. The composition of claim 11 wherein said urea channel inclusion complex constitutes about 0.5–2% by weight of the total weight of the salt complex, urea channel inclusion complex, and prepolymer.

15. The composition of claim 11 wherein the urea channel inclusion complex is composed of urea and 2-butoxyethyl stearate.

* * * * *